Aug. 18, 1942.  A. M. M. PIRONE  2,293,168
HANGER BAR
Filed July 18, 1940  2 Sheets-Sheet 1
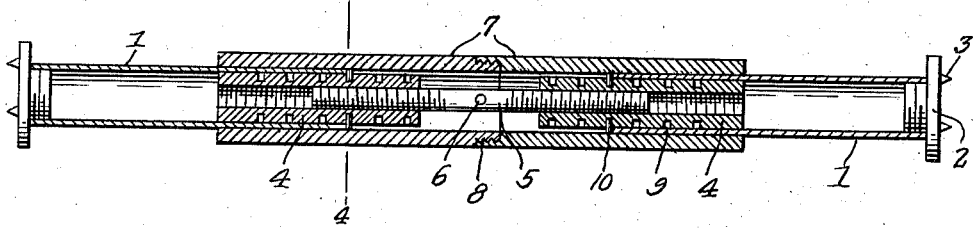
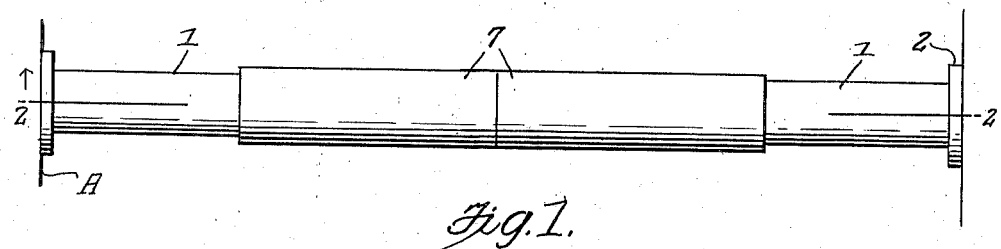
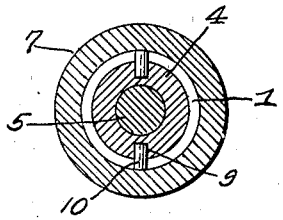
Inventor
A.M. Matthew Pirone
By Clarence A. O'Brien
Attorney Aug. 18, 1942.  A. M. M. PIRONE  2,293,168
HANGER BAR
Filed July 18, 1940  2 Sheets-Sheet 2
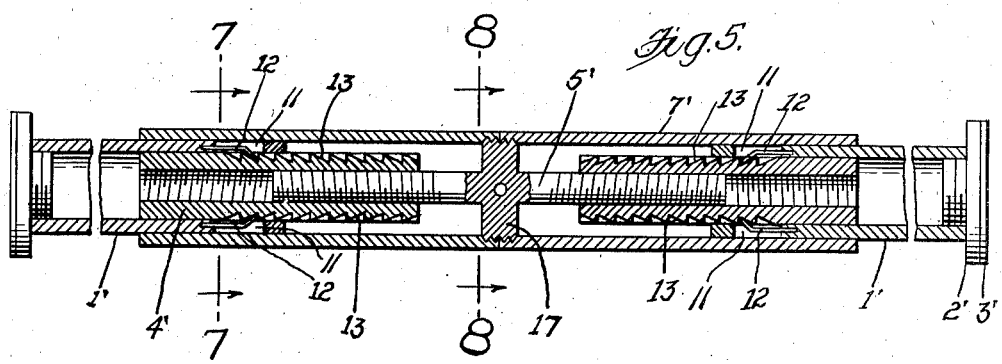
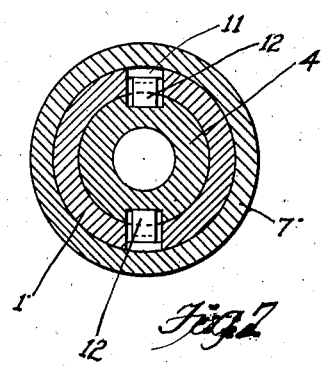
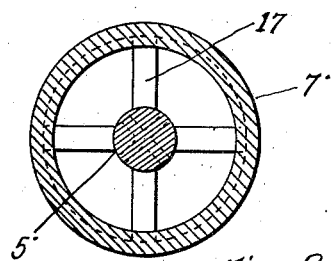
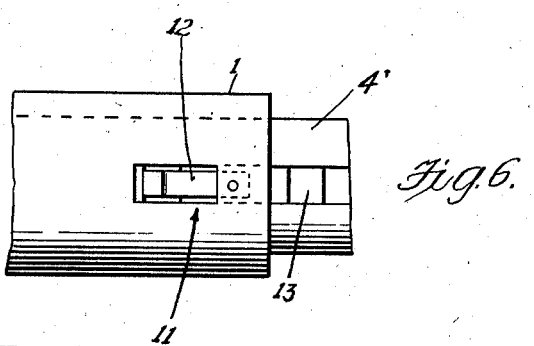
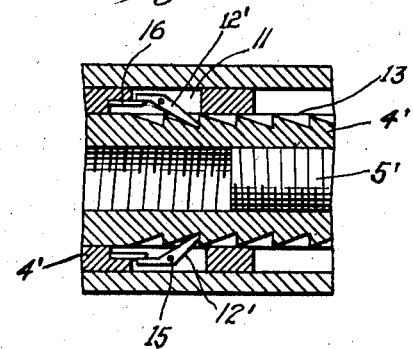
Inventor
A. M. Matthew Pirone
By Clarence A. O'Brien
Attorney Patented Aug. 18, 1942

2,293,168

UNITED STATES PATENT OFFICE 2,293,168

HANGER BAR

Amato Mario Matthew Pirone, Mount Vernon, N. Y.

Application July 18, 1940, Serial No. 346,239

5 Claims. (Cl. 211—123)

This invention relates to a hangar bar such as used in closets for holding articles of clothing or wherever it is desired to use a cross bar between two upright members.

The general object of the invention is to make the bar adjustable as to length so that it can be adjusted to fit the space between the two supporting members with means whereby the bar can be easily and quickly adjusted to have its ends engage the two members.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevational view showing the improved bar in use against two wall members.

Figure 2 is a longitudinal sectional view through the bar.

Figure 3 is an end view.

Figure 4 is a section on the line 4—4 of Figure 2.

Figure 5 is a longitudinal sectional view showing a modification of the invention.

Figure 6 is a fragmentary elevational view of parts of Figure 5.

Figure 7 is a section on the line 7—7 of Figure 5.

Figure 8 is a section on the line 8—8 of Figure 5.

Figure 9 is a fragmentary longitudinal sectional view through part of Figure 5.

In these views the numerals 1 indicate a pair of tubular members each having a cap 2 closing its outer end, the caps being provided with prongs 3 on the outer faces. The caps can be fastened in the members by threads as shown or they may simply fit in the members by friction so that the parts will rotate when one of the parts is held against movement. A pair of internally threaded short tubular members 4 is adapted to be placed in the members 1 and a bar 5 having its end portions oppositely screw-threaded as shown is adapted to have its threaded ends placed in the threaded ends of the tubular members 4 and said shaft has a centrally arranged hole 6 therein for receiving a tool or other object so that it can be turned. A pair of sleeves 7 is provided for fitting over the members 1 and the inner ends of the sleeves are adapted to be threaded together as shown at 8. The members 4 are provided with a plurality of holes 9 for receiving pins 10.

In using the device the sleeves 7 are separated from each other and the pins 10 are removed and then the members 1 are spread apart until the prongs 3 engage the wall members A as shown in Figure 1. A slight pressure by the hands on the members 1 will cause the prongs to engage the wall parts to a sufficient degree to hold the members 1 in place and as the members 1 are moved outwardly they slide on the members 4. Then the pins 10 are dropped in those holes which are adjacent the inner ends of the members 1 so as to prevent the members 4 from moving into the members 1. Then a tool or nail is inserted into the hole 6 and the bar 5 revolved so that its threads will force the members 4 outwardly and away from each other and this movement of the members 4 will cause the pins to engage the inner ends of the members 1 so as to move the members 1 away from each other to cause the prongs 3 to penetrate the wall members and cause the caps 2 to firmly engage said wall members and thus the parts of the cross bar are firmly engaged with the wall members. Then the sleeves 7 are moved toward each other and are rotated to cause their threaded ends 8 to engage each other and then the cross bar will have the appearance as shown in Figure 1 of a solid projectionless bar as only a slight elevation will appear where the outer ends of the sleeves fit over the members 1.

This device can not only be used as a closet bar but it can also be used as a curtain rod, drape rod, and wherever it is desired to use a cross bar.

In the modification shown in Figures 5, 6, 7 and 8 and 9, the members 1' have the caps 2' provided with disks 3' of rubber or the like though it will be understood that the caps may be provided with points but these protective disks will act to prevent marring of the parts contacted by the caps. The inner end of each member 1' is formed with a pair of oppositely arranged slots 11 in which extend dogs 12 and each member 4' has two sets of rack teeth 13, one set being arranged opposite the other and adapted to be engaged by the dogs, the parts being so arranged that the members 1' can be moved outwardly with the dogs ratcheting over the teeth but said teeth will be engaged by the dogs to prevent the members 1' from being pushed inwardly until the dogs are moved to releasing position. This can be done by inserting a tool or any other object into the slots 11 and moving the dogs outwardly. In Figures 5, 6, 7 and 8 the dogs are in the form of springs connected at one end to parts of the members 1' but in Figure 9 each dog 12' is pivoted to the walls of the slot as shown at 15 and a small spring 16 connected with a part of the member 1' acts to hold the dog in engagement with the rack teeth. Also, the threaded rod 5' is formed with radiating arms 17 at the center of the rod and have their outer ends threaded to engage the threads of the sleeves 7' so as to hold the inner ends of the sleeves in abutting relation as shown in Figure 5.

Thus the members 1' can be moved outwardly on the members 4' with the dogs simply sliding on the teeth but when the members are held in projected position by the dogs engaging the teeth it is necessary to positively release the dogs before the members 1' can be pushed inwardly. Of course, to move the dogs the sleeves 7' must be unthreaded from the arms 17 and moved to uncover the dogs in the slots and then the dogs can be released to permit the members 1' to be pushed inwardly.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A cross bar of the class described comprising a first pair of tubular members, a bar having its end portions oppositely screw-threaded, means whereby the bar can be turned and internally screw-threaded portions in the tubular members engaging the threaded portions of the bar whereby turning movement of the bar will cause the tubular members to move away from each other or toward each other, a pair of sleeves fitting over the tubular members and having their inner ends adapted to be threaded together, a second pair of tubular members, each having an end slidable between the first pair of tubular members and the sleeves, the other ends of said second pair of tubular members projecting outwardly at opposite ends of the sleeve, and cooperating stop means between the first and second pairs of tubular members limiting movement of the latter in one direction.

2. A cross bar of the class described comprising a pair of tubular members, caps in the outer ends of said members having prongs on their outer faces, a second pair of tubular members having their interiors threaded and their exteriors provided with holes, the second pair fitting in the first pair, projections adapted to be placed in the holes for engaging the inner ends of the first pair of tubular members, a bar having its end portions oppositely threaded and engaging the internal threads of the second pair of tubular members, said second pair when moved apart causing the projections to engage the inner ends of the first pair of tubular members to press said first pair of tubular parts outwardly, sleeves fitting over the first pair of tubular members and having their inner ends screw-threaded to be fastened together.

3. A cross bar of the class described comprising a pair of tubular members, a bar having its end portions oppositely screw-threaded, a pair of internally screw-threaded tubular members, the bores of which receive the threaded parts of the bar, ratchet teeth carried by the last-mentioned members and dogs carried by the first-mentioned members for engaging the ratchet teeth, the dogs ratcheting over the teeth when the first-mentioned members are moved outwardly but said dogs preventing inward movement of the first-mentioned members until the dogs are moved outwardly.

4. A cross bar of the class described comprising a pair of tubular members, a bar having its end portions oppositely screw-threaded, a pair of internally screw-threaded tubular members, the bores of which receive the threaded parts of the bar, ratchet teeth carried by the last-mentioned members and dogs carried by the first-mentioned members for engaging the ratchet teeth, the dogs ratcheting over the teeth when the first-mentioned members are moved outwardly but said dogs preventing inward movement of the first-mentioned members until the dogs are moved outwardly, said bar having radiating arms at its central portion having their outer ends threaded and a pair of sleeves slidably arranged on the first-mentioned members and having their inner ends threaded to engage the threaded ends of the arms.

5. A cross-bar of the class described comprising a first pair of tubular members, a bar having its end portions oppositely screw-threaded, means whereby the bar can be turned, a second pair of tubular members internally screw-threaded in the first pair of tubular members, the internal screw threads of the second pair of tubular members engaging the threaded parts of the bar whereby turning movement of the bar will cause the second pair of tubular members to move toward or away from each other, adjustable pick-up means between the first and second tubular members for moving the first pair of tubular members away from each other when the second pair of tubular members are moved outwardly by turning movement of the bar, and a sleeve slidably receiving the inner ends of said first pair of tubular members and enclosing said pick-up means.

A. M. MATTHEW PIRONE.